(12) United States Patent
Gyorfi et al.

(10) Patent No.: US 7,973,786 B2
(45) Date of Patent: Jul. 5, 2011

(54) SYSTEM AND METHOD FOR MANAGING INTERACTION IN A VIRTUAL ENVIRONMENT

(75) Inventors: Julius S. Gyorfi, Vernon Hills, IL (US); Eric R. Buhrke, Clarendon Hills, IL (US); Juan M. Lopez, Chicago, IL (US); Mark A. Tarlton, Barrington, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 780 days.

(21) Appl. No.: 11/689,890

(22) Filed: Mar. 22, 2007

(65) Prior Publication Data

US 2008/0172680 A1 Jul. 17, 2008

Related U.S. Application Data

(63) Continuation-in-part of application No. 11/623,652, filed on Jan. 16, 2007.

(51) Int. Cl.
*G06T 15/00* (2006.01)
(52) U.S. Cl. ........ 345/419; 345/582; 345/473; 709/204; 709/219; 715/753; 715/848; 717/115
(58) Field of Classification Search .................. 345/419, 345/582, 473; 709/203, 204, 217, 219, 227; 715/753, 757, 848, 850; 717/113, 115, 751, 717/804
See application file for complete search history.

(56) References Cited

U.S. PATENT DOCUMENTS

| 5,956,038 A | 9/1999 | Rekimoto | |
| 6,215,498 B1* | 4/2001 | Filo et al. | 345/419 |
| 6,262,734 B1* | 7/2001 | Ishikawa | 715/850 |

(Continued)

FOREIGN PATENT DOCUMENTS

JP 2003-117248 A 4/2003

(Continued)

OTHER PUBLICATIONS

Diverdi, Stephen; Nurmi, Daniel; and Hollerer, Tobias, "A Framework for Generic Inter-Application Interaction for 3D AR Environments," IEEE International Augmented Reality Toolkit Workshop, 2003, pp. 86-93.

(Continued)

*Primary Examiner* — Phu Nguyen
(74) *Attorney, Agent, or Firm* — Daniel K. Nichols; Kenneth A. Haas; Valerie M. Davis

(57) ABSTRACT

A first viewer (310) is activated to define and render a visualization of a first interactive virtual reality experience to a user. At least one first application (320, 330, 340) is selected for use with the first interactive virtual reality experience and at least one first event handler (321, 322, 323, 331, 341, 342) associated with the at least one first application is responsively activated. State information is responsively stored in the viewer concerning the objects in the virtual reality experience, the selected at least one first application (320, 330, 340) and the at least one first event handler (321, 322, 323, 331, 341, 342) in a memory. The first viewer (310), the at least one first application (320, 330, 340), and the at least one first event handler (321, 322, 323, 331, 341, 342) are then deactivated and a second viewer (350) associated with a second interactive virtual reality experience is activated.

19 Claims, 5 Drawing Sheets

U.S. PATENT DOCUMENTS

| | | | |
|---|---|---|---|
| 6,493,001 B1 * | 12/2002 | Takagi et al. | 715/759 |
| 6,552,721 B1 * | 4/2003 | Ishikawa | 345/418 |
| 6,570,563 B1 | 5/2003 | Honda | |
| 6,767,287 B1 | 7/2004 | McQuaid et al. | |
| 7,065,553 B1 * | 6/2006 | Chesley et al. | 709/205 |
| 7,191,220 B2 * | 3/2007 | Ohwa | 709/206 |
| 7,342,587 B2 * | 3/2008 | Danzig et al. | 345/473 |
| 7,362,349 B2 | 4/2008 | Nelson et al. | |
| 7,411,939 B1 | 8/2008 | Lamb et al. | |
| 7,417,959 B2 | 8/2008 | Dorner et al. | |
| 7,567,554 B2 | 7/2009 | Brown et al. | |
| 7,570,261 B1 * | 8/2009 | Edecker et al. | 345/420 |
| 7,696,992 B2 | 4/2010 | Gyorfi et al. | |
| 2002/0035604 A1 | 3/2002 | Cohen et al. | |
| 2002/0161821 A1 | 10/2002 | Narayan et al. | |
| 2004/0135820 A1 | 7/2004 | Deaton et al. | |
| 2004/0143852 A1 | 7/2004 | Meyers | |
| 2005/0043097 A1 | 2/2005 | March et al. | |

FOREIGN PATENT DOCUMENTS

| | | |
|---|---|---|
| WO | WO9942917 A2 | 8/1999 |
| WO | WO9942918 A2 | 8/1999 |
| WO | WO 2002-042921 A2 | 5/2002 |
| WO | WO 2005-020129 A2 | 3/2005 |

OTHER PUBLICATIONS

Jorissen, P.; Wijnants, M.; and Lamotte, W., "Dynamic Interactions in Physically Realistic Collaborative Virtual Environments," IEEE Transactions on Visualization and Computer Graphics, 2005, vol. 11, No. 6, pp. 649-660.

Caltagirone, et al., "Architecture for a Massively Multiplayer Online Role Playing Game Engine," Journal of Computing Sciences in Colleges, vol. 18, Issue 2, Dec. 2002, pp. 105-116.

Jorissen, et al., "Dynamic Interactions in Physically Realistic Collaborative Virtual Environments," IEEE Transactions on Visualization and Computer Graphics, vol. 11, No. 6, Nov./Dec. 2005, 649-660.

Athina Nickitas-Etienne, PCT/US2007/088941—PCT International Preliminary Report on Patentability, The International Bureau of WIPO, Geneva, Switzerland, Jul. 30, 2009.

Wikipedia/Blizzard Entertainment, "World of Warcraft-XP-002579394," Wikipedia, the free encyclopdia, Edited by Credema, Jan. 15, 2007, Downloaded Apr. 23, 2010, 16 pages.

Wikipedia/Blizzard Entertainment, "World of Warcraft-XP-002579395," Wikipedia, the free encyclopdia, Downloaded Apr. 23, 2010, 2 pages.

Paul Garton, "Corresponding Application EP 07866049.5-European Search Report," European Patent Office, Munich Germany, May 7, 2010, 6 pages (whole document).

\* cited by examiner

SYSTEM AND METHOD FOR MANAGING INTERACTION IN A VIRTUAL ENVIRONMENT

CROSS REFERENCE TO RELATED APPLICATIONS

This application is a continuation-in-part application of application Ser. No. 11/623,652, filed on Jan. 16, 2007, which is incorporated herein by reference in its entirety.

FIELD OF THE INVENTION

The field of the invention relates generally to interactive virtual reality experiences and more particularly to the management of virtual experiences.

BACKGROUND OF THE INVENTION

Interactive virtual reality experiences are known in the art. Such experiences often make use of a multi-media presentation to present a virtual space, such as a room or the like, within which the user can interact with animate and/or inanimate objects and/or other participants. Such experiences are often employed to facilitate an entertainment activity or to facilitate conferencing, event management, or the like.

In some cases, a participant in such an experience may find it useful or even necessary to participate in multiple such experiences in a quasi-parallel or rapidly successive manner. During a significant civic emergency, for example, a high ranking authority figure such as a mayor may wish or need to participate in various public safety interactive virtual reality experiences (as correspond, for example, to a police conference room, a fire fighters conference room, and so forth).

Prior art solutions provide techniques for moving from one such virtual setting to another in order to facilitate such successive participation by such an individual. In general, however, such solutions tend to either fully integrate the entire scope of the experience (and hence can consume large quantities of network bandwidth as well as remote and local computational capacity) or to treat such successive experiences in a discrete and fully independent manner (and hence can lead to undesired interruptions, delays, and reduced fluidity as the user moves from setting to setting).

BRIEF DESCRIPTION OF THE DRAWINGS

The above needs are at least partially met through provision of the method and apparatus for managing interactions in a virtual environment described in the following detailed description, particularly when studied in conjunction with the drawings, wherein.

Figure 1:
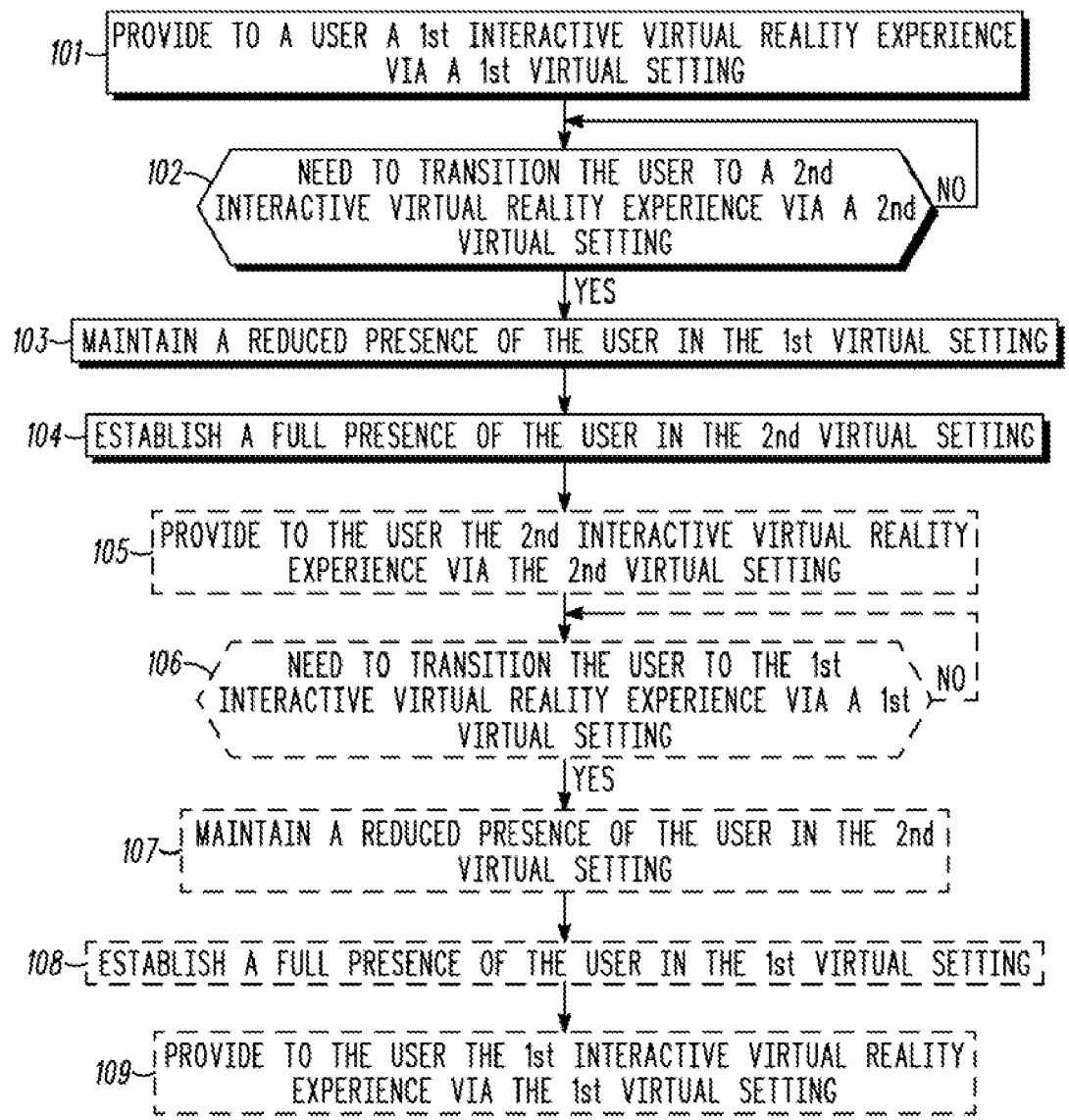
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method are provided that allow a user to transition seamlessly between different interactive virtual reality experiences presented by different viewers. By storing state information related to the applications and event handlers of the different interactive virtual reality experiences in their respective viewers, the user can transition from an original virtual reality experience to a new virtual reality experience and then back to the original virtual reality experience seamlessly, without perceptible delay, and without losing information concerning the user's state within any of the virtual reality experiences presented by any viewer. The approaches provided herein are easy to use and provide for enhanced user satisfaction when transitioning occurs between different interactive virtual reality experiences.

In many of these embodiments, a first viewer is activated to define and render a visualization of a first interactive virtual reality experience to a user. At least one first application is selected for use with the first interactive virtual reality experience and at least one first event handler associated with the first application is responsively activated. Subsequently, state information is responsively stored in the first viewer concerning the selected first application and first event handler. The first viewer, the first application, and the first event handler are thereafter deactivated. A second viewer associated with a second interactive virtual reality experience is then activated.

At least one second application associated with the second interactive virtual reality experience may also be selected. In addition, at least one second event handler associated with the second application may then be responsively activated and state information concerning the second application and the second event handler may be responsively stored in the second viewer.

The second viewer may then be deactivated at a later time and the first viewer may then be re-activated. The selected first application and the selected first event handler may be re-activated using the stored state information concerning the first application and the first event handler stored in the first viewer.

In one example, the visualization presented to a user comprises a room. In other examples, the visualization may be other areas such as buildings, parks, or areas of cities. Other types of visualizations may also be presented.

The first application may be selected by receiving a client application selection triggering event and determining the first application, as a function, at least in part, of the client application selection triggering event. The client application selection triggering event may originate from a device such as a keyboard, computer mouse, track ball, joy stick, game pad, or position sensor. The application may be any type of application such as an email application, video display application, document display application, location visualization application, or a security camera display application.

Thus, approaches are provided that allow a user to transition seamlessly between different interactive virtual reality experiences. By storing state information related to the applications and event handlers of interactive virtual reality experiences in their respective viewers, the user can transition from an original interactive virtual reality experience to another interactive virtual reality experience and then back to the original interactive virtual reality experience seamlessly, without substantial delay, and without losing information simply by activating the respective viewers associated with those interactive virtual reality experiences. The approaches provided are easy to use and provide for enhanced user satisfaction as transitions between interactive virtual reality experiences occur.

These and other benefits may become clearer upon making a thorough review and study of the following detailed description. Referring now to the drawings, and in particular to FIG. 1, an exemplary illustrative process 100 provides 101 a first interactive virtual reality experience via a first virtual setting to a given user. This interactive virtual reality experience can comprise any of a wide variety of experiences as are presently known or as may be developed going forward.

By one approach this experience can comprise an experience that provides substantially real-time interaction with at least one other user. This can comprise, for example, a collaborative environment where persons having a shared interest can share data, confer, propose ideas, and, in general, manage a corresponding process of interest. So configured, for example, users collaborating in the virtual reality experience may be able to share access to one or more informational inputs.

The virtual setting itself can also comprise any of a wide variety of form factors and/or constructs as desired. By one approach, this virtual setting can comprise a virtual room (such as, but not limited to, a conference room or a command center) having tools and the like to facilitate the sharing of information. Such tools can comprise, but are not limited to, virtual display screens, user manipulable controls, and so forth.

Also, if desired, this interactive virtual reality experience can include the use of avatars that represent (in as realistic or fanciful a manner as desired) the various users who are interacting within the virtual setting with one another. Such avatars can serve to assist with interacting with other elements of the virtual setting and/or to facilitate an understanding of which user is offering which inputs.

In a not untypical scenario, this step of providing a first interactive virtual reality experience may comprise using one or more application servers that assemble and provide (often using streaming technologies of choice) the corresponding renderable content to the users via a client application (or applications). In general, the elements of providing such an experience are well known in the art and require no further elaboration here.

This process 100 then provides for detecting 102 a need to transition the user from the first interactive virtual reality experience to a second interactive virtual reality experience via a second virtual setting. In a typical application scenario this second virtual setting will be different from the first virtual setting. To provide a practical illustration in this regard (and without intending any suggestion of limitation or exhaustion in this regard), the user might comprise the mayor of a town with the first virtual setting comprising a police services command center and the second virtual setting comprising a fire fighter services command center. In such a case, this step of detecting 102 such a need will comprise detecting the need to transition the mayor from the police command center virtual setting to the fire fighters command center virtual setting.

These are various ways by which such a need can be detected. By one approach, the user can be supplied with a user interface opportunity that serves to communicate this need. This might comprise, for example, a virtual assertable control in the first virtual setting or, if desired, something as intuitive and simple as a virtual door in the first virtual setting that leads the user (via their avatar, for example) to the second virtual setting. Again, such user interfaces are known in the art and require no further detailed description here.

Upon detecting 102 such a need, this process 100 then provides for maintaining 103 a reduced presence of the user in the first virtual setting. This does not comprise the trivial case of deleting the user's presence in the first virtual setting; instead, this comprises diminishing the presence of the user from a full status to a less-than-completely-deleted status.

By one approach, for example, this can comprise marking an avatar as corresponds to the user in the first virtual setting with an indicator that indicates the reduced presence of the user in the first virtual setting. This might comprise, for example, rendering the avatar in a grayed-out manner, or placing a small sign bearing a message such as "absent" near the avatar. So configured, other users in the first virtual setting will be able to observe or otherwise experience, on at least some level, the user's avatar but will also be able to assess and understand the reduced presence of the corresponding user.

As another example in this regard, this can comprise suspending at least some processes as pertain to providing to the user the first interactive virtual reality experience via the first virtual setting. Various processes are reasonable candidates for such treatment. Examples include, but are not limited to, streaming video processes, streaming audio processes, and streaming audio-video processes as are known in the art.

In many cases, this step of maintaining 103 a reduced presence of the user in the first virtual setting can comprise, at least in part, directing information from the client device(s) for the user to the corresponding application server for the first interactive virtual reality experience regarding the user's reduced presence status. By one approach this can comprise a relatively simple and short representation. Such an approach may be appropriate when the application server is pre-configured to affect the desired reduced presence functionality when so instructed by the application server. By another approach this can comprise a series of specific instructions from the application server regarding which actions are specifically to be taken to effect the desired reduction in presence.

This process 100 then also provides for establishing 104 a full presence of the user in the second virtual setting. This step occurs notwithstanding the previous step regarding reducing (which does not include deleting) the presence of the user in the first virtual space. Establishing 104 this full presence can comprise, for example, facilitating at least some processes (such as the aforementioned streaming processes) as pertain to providing the user with the second interactive virtual reality experience via the second virtual setting. These steps of establishing such a full presence, of course, can then lead to optionally providing 105 to this user the second interactive virtual reality experience via the second virtual setting.

If desired, this process 100 can be readily expanded to include, for example, later detecting 106 a need to transition the user from the second interactive virtual reality experience back to the first interactive virtual reality experience. Upon detecting such a need, this process 100 can then facilitate maintaining 107 a reduced presence of the user in the second virtual setting while then also establishing 108 a full presence of the user back in the first virtual setting as part of then providing 109 to that user the first interactive virtual reality experience via the first virtual setting. Again establishing a full presence in the first virtual setting can comprise, for example, again facilitating the relevant attendant processes such as, but not limited to, the aforementioned streaming processes. This can also comprise removing the indicator that marks the user's avatar as having a reduced presence.

Figure 2:
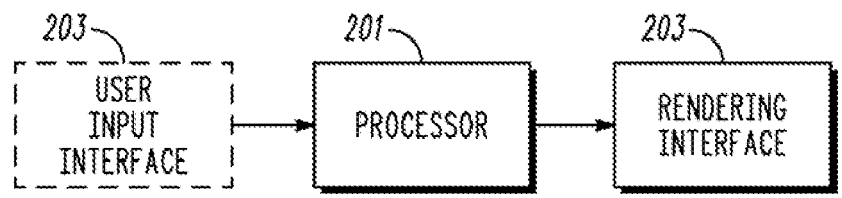
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

Such an apparatus 200 can be generally comprised of a processor 201 (which may comprise one or more processing platforms as will be well understood by those skilled in the art) that operably couples to a rendering interface 202 (which may comprise, for example, one or more displays, audio transducers, haptic transducers, and so forth). This rendering interface serves, at least in part, to provide rendered content (visual, audible, or the like) to the user. In addition, in an optional configuration, the processor 201 will operably couple to a user input interface 203 to permit and facilitate the receipt of user instructions, reactions, and so forth (which may comprise, for example, a keyboard, a cursor movement device, and so forth).

So configured, the processor 201 can be readily configured and arranged (via, for example, corresponding programming), to effect selected teachings as are set forth herein. This can comprise, for example, using the rendering interface to provide to the user the first interactive virtual reality experience via the first virtual setting, detecting the need to transition the user to the second interactive virtual reality experience via the second virtual setting, maintaining the reduced presence of the user in the first virtual setting when effecting such a transition, and establishing a full presence of the user in the second virtual setting as described above (in addition to such other described actions as may be further implemented).

Those skilled in the art will recognize that a virtual setting manager as described herein can be configured and arranged to suit the particular needs and/or opportunities as tend to characterize a wide variety of application settings. Consider, for example, the following illustrative scenario.

In this example, a user selects a virtual setting comprising a first room. The virtual setting manager checks if the user is currently in another existing virtual setting room from which the user must transition to the virtual setting comprising a first room. If this is the case, the virtual setting manager can act in accordance with these teachings to reduce the user's presence in the other existing virtual setting room.

Having concluded the latter step (or when no existing virtual setting already exists), the virtual setting manager can then determine whether the requested first room already exists. If not, the virtual setting manager can create a new corresponding viewer and scene-graph branch in accordance with prior art practice in this regard and also establish one or more connections to the corresponding application server or servers as needed.

At this point, if desired, the virtual setting manager can check to confirm the validity of the newly created room. Lacking apparent validity, the virtual setting manager will attempt to restore the other existing virtual room. If there was no other existing room, the virtual setting manager can signal an error condition to the user, system administrator, and/or other interested party. Following this action, or when the above-described determination regarding validity of the new room proves true, the virtual setting manager can then start (if this is the first entry into the room) or resume (if this is a re-entry into the room) the processes of the virtual setting comprising a first room.

At this point, the virtual setting manager can now enable the corresponding viewer and the ability of the user to provide input to the new room. The virtual setting manager can also switch applicable global applications to the new viewer. At this point the virtual setting manager is now rendering the new room for the user and the process can continue in conformance with desired practice going forward.

Those skilled in the art will recognize that the foregoing example is intended to serve only in an illustrative capacity and is not intended to comprise an exhaustive presentation in this regard or to otherwise serve as a limitation by example. The skilled artisan will also now readily understand and appreciate that these teachings are readily applied and leveraged in a variety of application settings and can further be readily scaled to accommodate a large number of virtual settings and the like. It will further be appreciated that these teachings are readily implementable in a relatively cost effective manner.

In many of these examples, a virtual setting manager including one or more viewers may be maintained at a client device (e.g., a mobile station such as a cellular phone, pager, personal digital assistant, or personal computer) that includes or accesses one or more viewers. The virtual setting manager and its components may be implemented as any suitable combination of hardware and/or software components. The virtual setting manager receives user input to select viewers that present interactive virtual reality experiences to a user. Other user input is received to select applications that are associated with a particular viewer and interactive virtual reality experience, and to transition between viewers and interactive virtual reality experiences.

Figure 3:
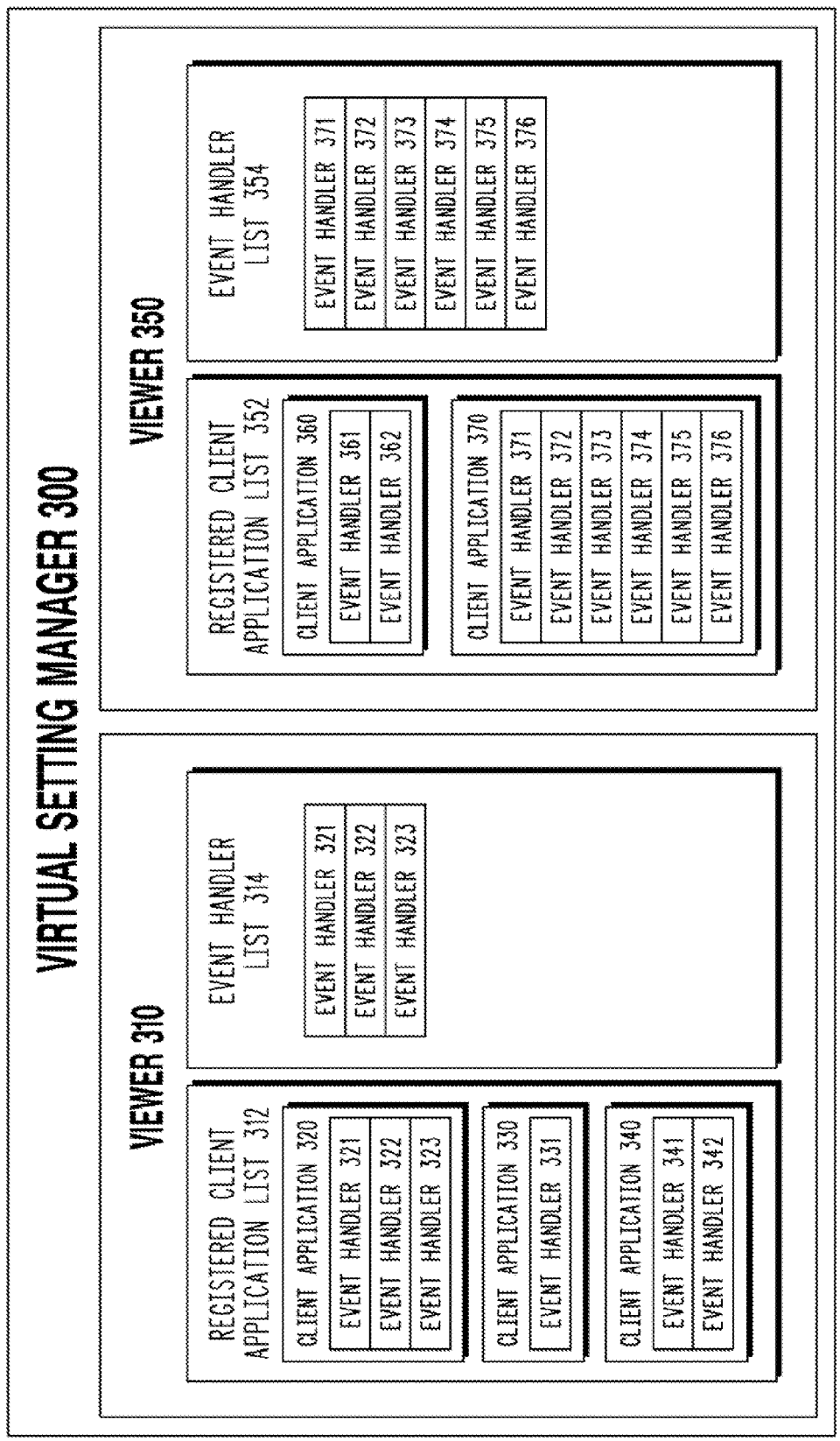
FIG. 3 comprises a block diagram of a virtual setting manager with one or more viewers in accordance with various embodiments of the invention.

In one example of these approaches and now referring to FIG. 3, a virtual setting manager 300 includes a first viewer 310 and up to an nth viewer 350 (i.e., there are 1 to n viewers where n is some positive integer). Respectively, the viewers 310 and 350 include registered client application lists 312 and 352 and event handler lists 314 and 354.

The viewers 310 and 350 encapsulate all the information necessary to present an interactive virtual reality experience, including virtual cameras representing the user's viewpoint within the virtual environment as well as all the applications and event handlers for the interactive virtual reality experience. In one example, the viewers present a visualization of a particular interactive virtual reality experience such as a room to a user.

The registered client application lists 312 and 352 contain the applications that are registered for use with their respective viewers. In this example, three client applications are registered with viewer 310: client application 320 (with its associated event handlers 321, 322, and 323), client application 330 (with event handler 331), and client application 340 (with event handlers 341 and 342). There are two client applications registered with viewer 350: client application 360 (with its associated event handlers 361 and 362) and client application 370 (with event handlers 371, 372, 373, 374, 375, and 376).

The event handlers 321, 322, 323, 331, 341, 342, 361, 362, 371, 372, 373, 374, 375, and 376 may be used to process input for their respective applications. For example, each of the event handlers 321, 322, 323, 331, 341, 342, 361, 362, 371, 372, 373, 374, 375, and 376 may be adapted to process a particular type of user input (e.g., computer mouse or keyboard). The event handler lists 314 and 354 indicate the particular event handlers that are active for their corresponding viewers, i.e. when a viewer is selected from the virtual setting manager and activated, the event handlers within the viewer's event handler list will be enabled to receive and process user input. Referring again to FIG. 3, the event handler list 314 for viewer 310 contains the event handlers 321, 322, and 323 from client application 320. Similarly, the event handler list 354 for viewer 350 contains event handlers 371, 372, 373, 374, 375, and 376 from client application 370.

The applications 320, 330, 340, 360, and 370 provide different types of services to users. For example, the applications 320, 330, 340, 360, and 370 may be email applications, video display applications, document display applications, location visualization applications, or security camera display applications. Other examples of applications are possible. When a particular viewer 310 or 350 is selected, the viewer is used to render an interactive virtual reality experience to a user as described below with respect to FIG. 4.

Figure 4:
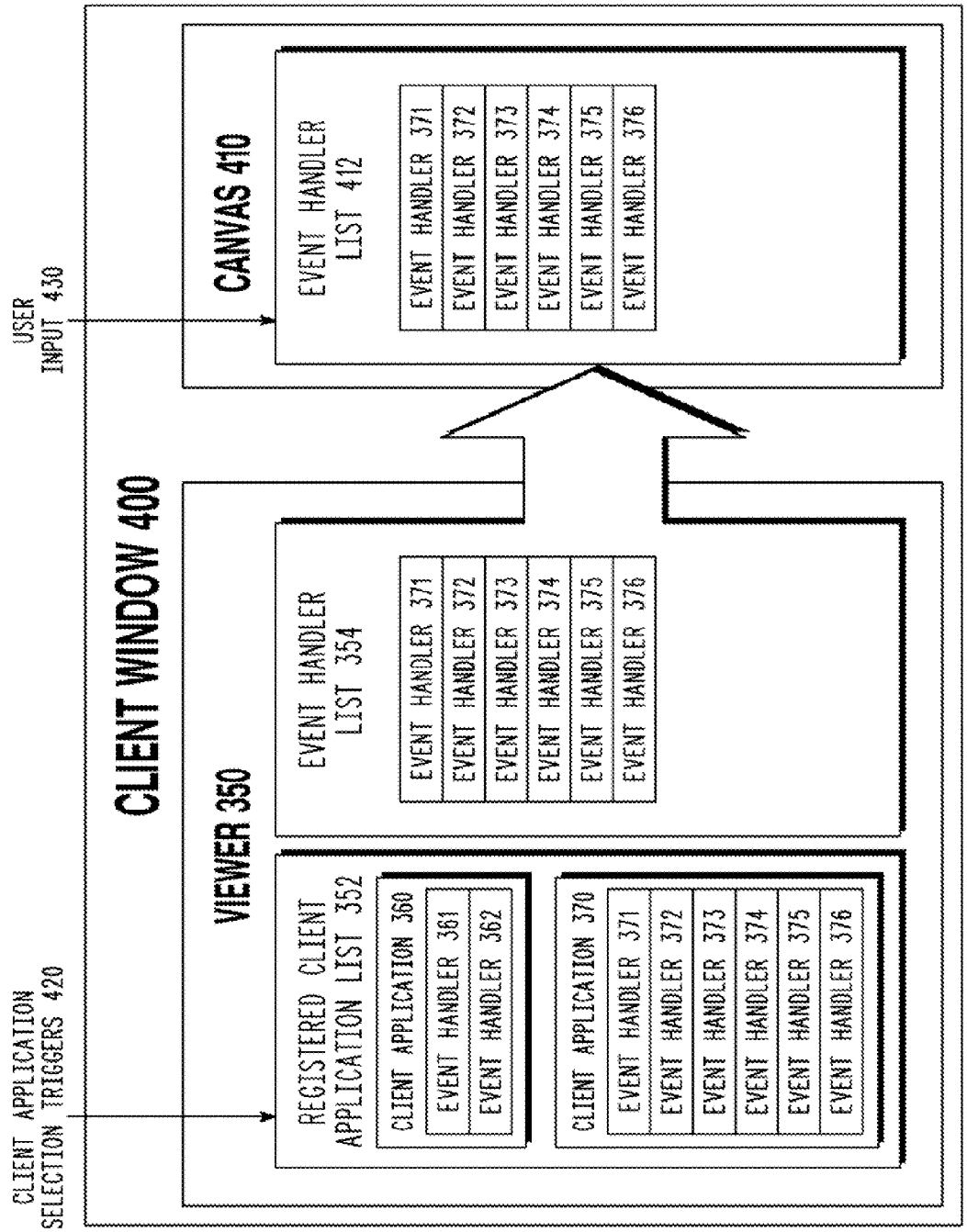
FIG. 4 comprises a block diagram of a client window in use in accordance with various embodiments of the invention.

Referring now to FIG. 4, one example of a selected viewer (viewer 350 from FIG. 3) and the use of this viewer are illustrated. A client window 400 is a software and/or hardware environment that includes a viewer 350 and a canvas 410. The viewer 350 has been selected from the virtual setting manager and activated by adding it to the client window. The canvas 410 in the client window 400 presents graphical images to a user. In one example, the canvas 410 is the window on the screen of a mobile station where the visualization of a virtual reality experience is presented. The canvas is responsible for both rendering the virtual reality setting and processing user input for the interactive virtual reality experience. Upon selection and activation, a viewer will attach the event handlers in its event handler list to the canvas to begin processing user input. This is shown in FIG. 4 where event handlers 371, 372, 373, 374, 375, and 376 from the event handler list 354 of the viewer 350 are copied to canvas 410's event handler list 412.

Once a viewer has been activated and its event handlers attached to the canvas, user input 430 is captured by the canvas 410 and processed by the event handlers in the canvas's event handler list 412 until a client application selection trigger 420 is received by the viewer. Client application selection triggers are generated through the user interface and pass through the client window and the active viewer into the active viewer's registered client application list as shown in FIG. 4. In one preferred approach, there is a unique trigger to select a particular client application, although there may be situations in which it is desirable to activate multiple client applications with one particular trigger. The selected client application(s) will then add their event handlers to the viewer's event handler list where they will be immediately attached to the canvas. In a similar fashion, any currently active client application that was not selected by the trigger will remove its event handlers from the viewer's event handler list which will immediately remove them from the canvas's event handler list also.

In one example of the operation of FIG. 4, viewer 350 is active. Client application 370 registered to viewer 350 is the currently active client application and its event handlers are currently attached to the canvas 410. A client application selection trigger 420 for client application 360 is generated. Client application trigger 420 is passed through to the registered client application list 352 (of viewer 350) where it activates client application 360. Client application 360 adds its event handlers 361 and 362 to the event handler list 354 of the viewer 350 where they are immediately attached to canvas 410 through event handler list 412 (of canvas 410). Because the trigger was only for client application 360, client application 370 must be considered unselected. As such, it must remove its event handlers 371, 372, 373, 374, 375, and 376 from event handler list 354 (of viewer 350); they are also immediately detached from canvas 410 by being removed from event handler list 412 (of canvas 410). At this point, any new user input 430 will be processed by event handlers 361 and 362 instead of event handlers 371, 372, 373, 374, 375, and 376 as would have happened before the client application 360 selection trigger 420.

The viewer itself is a software entity and data structure that resides in a memory that is used to retain state information when the viewer is deactivated. For example, the memory includes the registered client application list 352 and the event handler list 354. The memory also includes information about the position (e.g., position and orientation) of the user (e.g., represented by an avatar) in the virtual experience.

Figure 5:
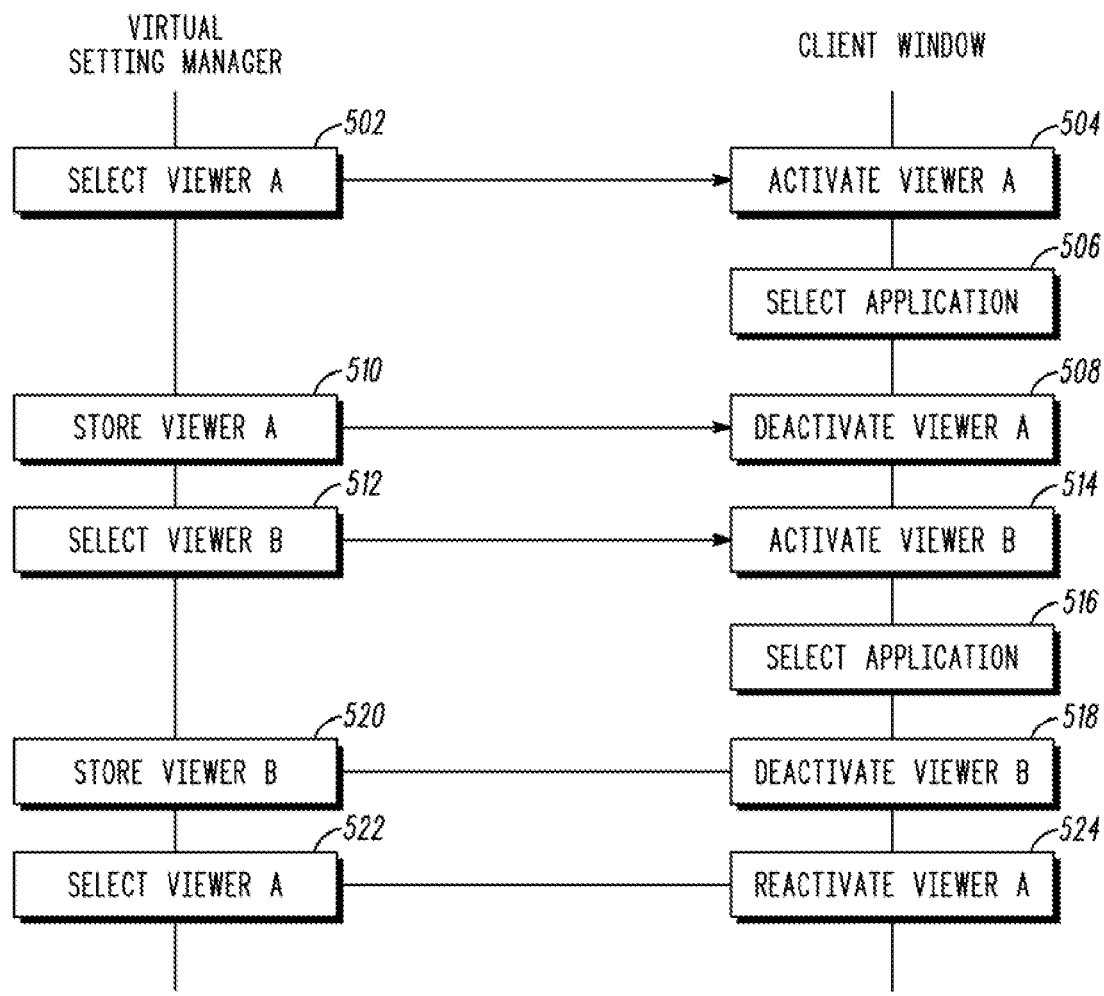
FIG. 5 comprises a flowchart of an approach for transitioning between virtual experiences in accordance with various embodiments of the invention.

Referring now to FIG. 5, one example of an approach for transitioning between interactive virtual reality experiences is described. At step 502, a first viewer "A" is selected from the virtual setting manager to define and render a visualization of a first interactive virtual reality experience to a user. At step 504, the viewer "A" is activated by adding it to the client window where the viewer's event handler list will be attached to the canvas within the client window. At step 506 one or more first applications are selected for use with the first interactive virtual reality experience. At step 506, one or more first event handlers associated with the first applications are also activated.

At step 508, the first viewer "A," the first applications, and the first event handlers are deactivated. The viewer "A" is deactivated by removing it from the client window and placing it back in the virtual setting manager where its state will be stored in step 510. This state includes the location and orientation of the user's avatar and all other objects within the virtual reality experience, the client applications that were active, and the event handlers that were active.

A second viewer "B" associated with a second interactive virtual reality experience is selected from the virtual setting manager in step 512 and activated in step 514 by adding it to the client window. At step 516, one or more second applications registered with the second viewer "B" are selected, which in turn activates one or more second event handlers associated with the second applications.

At step 518, the second viewer "B," the second applications, and the second event handlers are deactivated and the viewer's state information is stored in the virtual setting manager at step 520. At step 522, the first state information concerning the first viewer "A," first applications, and first event handlers are accessed from the virtual setting manager. At step 524, the first viewer "A" is re-activated using this state information that has been retrieved from the virtual setting manager. Specifically, the first applications and the first event handlers are re-activated using the state information. Consequently, the user can move between the first and second viewers seamlessly without losing state information and resume their actions at each viewer using substantially the same state in which they left the viewer.

Figure 6:
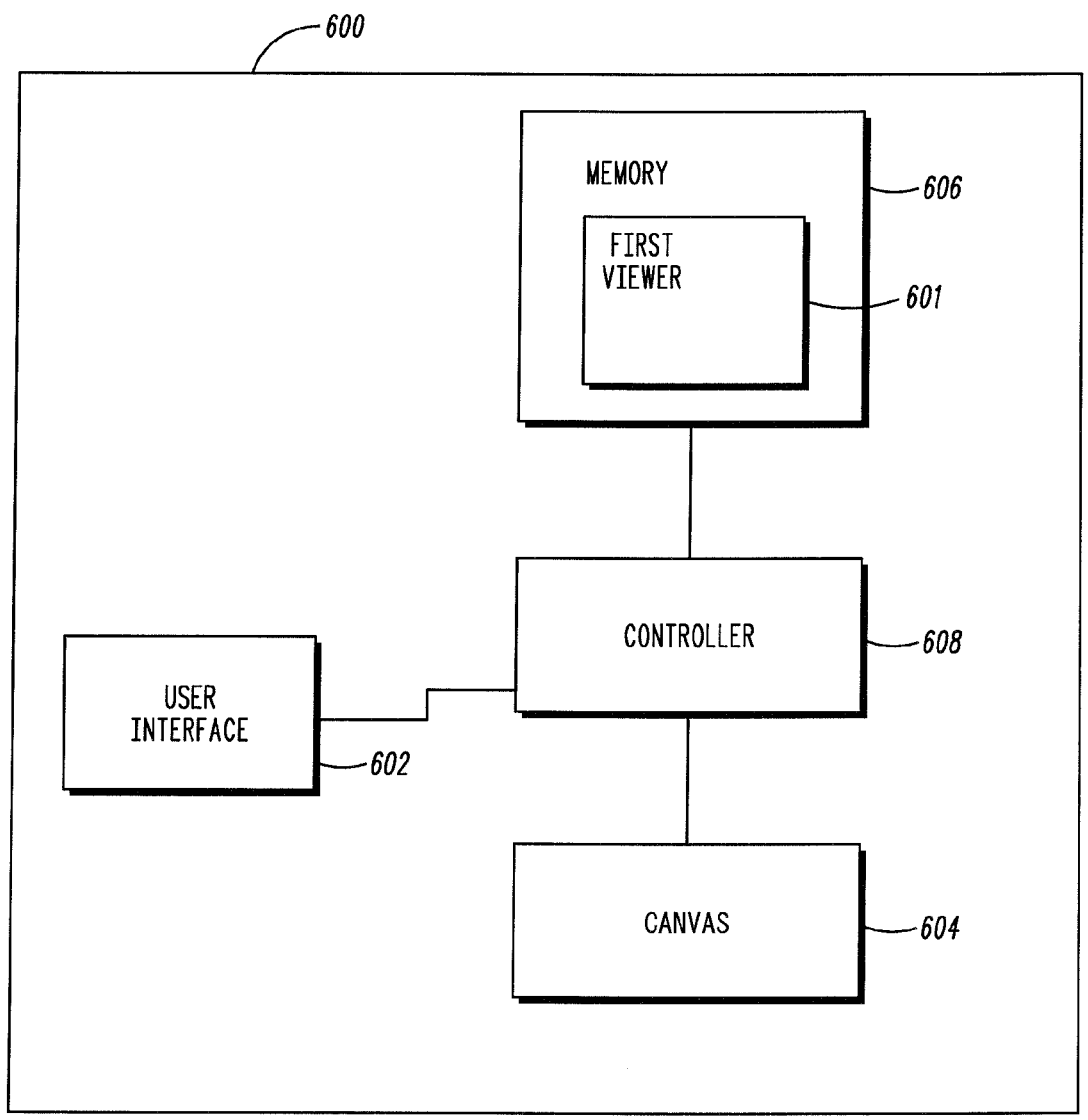
FIG. 6 comprises a block diagram of a device for transitioning between different interactive virtual reality experiences according to the present invention.

Referring now to FIG. 6, an example of a device 600 that facilitates transitions between interactive virtual reality experiences is described. The device 600 includes a first viewer 601 that is associated with a first interactive virtual reality experience. The device also includes a user interface 602, a canvas 604, a memory 606 (which includes the viewer 601), and a controller 608.

The controller 608 is configured and arranged to activate the first viewer 601 from the memory 606 and thereby render a visualization of a first interactive virtual reality experience on the canvas 604 to a user. The controller 608 receives from the user interface 602 a selection of one or more applications (associated with the first interactive virtual reality experience) that a user desires to utilize. The controller 608 is configured and arranged to responsively activate one or more event handlers associated with the applications and to periodically store a state of the first interactive virtual reality experience in the memory 606 for use after the first viewer 601 has been deactivated and then subsequently re-activated.

The controller 608 is further configured and arranged to subsequently deactivate the first viewer 601, the applications, and the event handlers when a selection of a second viewer (not shown) associated with a second interactive virtual reality experience is received at the user interface 602. After the second viewer is deactivated, the user can return to activate the first viewer 601. The stored state of the first viewer 601 is used to restore the first interactive virtual realty experience to the substantially same state in which the first viewer had been before it was deactivated.

Thus, approaches are provided that allow a user to transition seamlessly between different virtual experiences. By storing state information related to the applications and event handlers of previously active viewers, the user can transition to another viewer and then back to the original viewer seamlessly, without delay, and without losing information. The approaches provided are easy to use and provide for enhanced user satisfaction when transitioning occurs.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of facilitating transitions between multiple interactive virtual reality experiences comprising:
    activating by a controller a first viewer to define and render a visualization of a first interactive virtual reality experience to a user;
    selecting by the controller at least one first application for use with the first interactive virtual reality experience and responsively activating at least one first event handler associated with the at least one first application;
    subsequently responsively storing state information by the controller, the state information concerning the selected at least one first application and the at least one first event handler in the first viewer;
    deactivating by the controller the first viewer, the at least one first application, and the at least one first event handler; and
    activating by the controller a second viewer associated with a second interactive virtual reality experience.

2. The method of claim 1 wherein the visualization comprises a room.

3. The method of claim 1 wherein selecting the at least one first application comprises receiving a client application selection triggering event and determining the at least one first application, as a function, at least in part, of the client application selection triggering event.

4. The method of claim 3 wherein the triggering event originates from a device selected from a group comprising: a keyboard; a computer mouse; a track ball; a joy stick; a game pad; and a position sensor.

5. The method of claim 1 wherein the at least one first application is selected from a group comprising an email application; a video display application; a document display application; a location visualization application; and a security camera display application.

6. The method of claim 1 further comprising selecting at least one second application associated with the second interactive virtual reality experience.

7. The method of claim 6 further comprising responsively activating at least one second event handler associated with the at least one second application and responsively storing state information concerning the at least one second application and the at least one second event handler in the second viewer.

8. The method of claim 1 further comprising deactivating the second viewer and subsequently re-activating the selected at least one first application and the selected at least one first event handler using the state information concerning the selected at least one first application and the at least one first event handler.

9. A method of facilitating transitions between multiple interactive virtual reality experiences comprising:
    at a viewer that is presenting an interactive virtual reality experience to a user:
        selecting by a controller, at least one application associated with the interactive virtual reality experience and activating at least one event handler associated with the at least one application;
        storing by the controller, state information concerning a state of the interactive virtual reality experience in the viewer including a state of the at least one application and a state of the at least one event handler; and
        deactivating by the controller, the viewer, the at least one application, and the at least one event handler; and
        subsequently re-activating by the controller, the viewer, the at least one application, and the at least one event handler by using the state information stored in the viewer.

10. The method of claim 9 wherein the interactive virtual reality experience comprises a visualization of a room.

11. The method of claim 9 wherein selecting the at least one application comprises receiving a client application selection triggering event and determining the at least one application, as a function, at least in part, of the client application selection triggering event.

12. The method of claim 11 wherein the triggering event originates from a device selected from a group comprising: a keyboard; a computer mouse; a track ball; a joy stick; a game pad; and a position sensor.

13. The method of claim 9 wherein the at least one application is selected from a group comprising an email application; a video display application; a document display application; a location visualization application; and a security camera display application.

14. A system comprising:
a first viewer associated with a first interactive virtual reality experience;
a user interface;
a canvas;
a memory comprising the first viewer; and
a controller communicatively coupled to the memory, the user interface, and the canvas, the controller being configured and arranged to activate the first viewer in the memory in order to present a rendering of the first interactive virtual reality experience on the canvas to a user, the controller receiving from the user interface a selection of at least one application associated with the first interactive virtual reality experience, the controller being configured and arranged to responsively activate at least one event handler associated with the at least one application and to periodically store a state of the first interactive virtual reality experience in the memory for use after the first viewer is deactivated and then subsequently re-activated, the controller being further configured and arranged to subsequently deactivate the first viewer, the at least one application, and the at least one event handler when a selection of a second viewer associated with a second interactive virtual reality experience is received at the user interface.

15. The system of claim 14 wherein the controller is further configured and arranged to re-activate the first viewer by using the state of the first interactive virtual reality experience stored in the memory.

16. The system of claim 14 wherein the state of the first interactive virtual reality experience comprises an identity of the at least one application and the at least one event handler.

17. The system of claim 14 wherein the user interface is a device selected from a group comprising: a keyboard; a computer mouse; a track ball; a joy stick; a game pad; and a position sensor.

18. The system of claim 14 wherein the at least one application is selected from a group comprising an email application; a video display application; a document display application; a location visualization application; and a security camera display application.

19. The system of claim 14 wherein the canvas comprises a video display.

\* \* \* \* \*